United States Patent
Kim et al.

(10) Patent No.: US 11,618,456 B2
(45) Date of Patent: Apr. 4, 2023

(54) APPARATUS AND METHOD FOR CONTROLLING DRIVING OF VEHICLE

(71) Applicants: HYUNDAI MOTOR COMPANY, Seoul (KR); KIA MOTORS CORPORATION, Seoul (KR)

(72) Inventors: Byeonghwa Kim, Incheon (KR); Junho Yang, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 178 days.

(21) Appl. No.: 17/034,582

(22) Filed: Sep. 28, 2020

(65) Prior Publication Data

US 2021/0403002 A1    Dec. 30, 2021

(30) Foreign Application Priority Data

Jun. 26, 2020   (KR) ........................ 10-2020-0078289

(51) Int. Cl.
| | | |
|---|---|---|
| *G08B 23/00* | (2006.01) | |
| *B60W 40/09* | (2012.01) | |
| *B60W 30/095* | (2012.01) | |
| *B60W 30/09* | (2012.01) | |
| *B60W 10/18* | (2012.01) | |

(52) U.S. Cl.
CPC ............ *B60W 40/09* (2013.01); *B60W 10/18* (2013.01); *B60W 30/09* (2013.01); *B60W 30/095* (2013.01); *B60W 2510/202* (2013.01); *B60W 2540/229* (2020.02); *B60W 2540/30* (2013.01)

(58) Field of Classification Search
CPC ...... B60W 40/09; B60W 10/18; B60W 30/09; B60W 30/095; B60W 2540/229; B60W 2510/202; B60W 2540/30
See application file for complete search history.

(56) References Cited

U.S. PATENT DOCUMENTS

| | | | | |
|---|---|---|---|---|
| 7,605,773 | B2* | 10/2009 | Janssen | G02B 27/01 345/619 |
| 8,407,622 | B2* | 3/2013 | Rhee | G06F 3/04817 715/810 |
| 9,260,095 | B2* | 2/2016 | Chundrlik, Jr | B60T 7/22 |
| 9,854,086 | B1* | 12/2017 | McSchooler | H04W 4/027 |
| 10,723,348 | B2* | 7/2020 | Lee | G06V 20/597 |
| 2003/0181822 | A1* | 9/2003 | Victor | A61B 5/1114 600/558 |
| 2004/0239509 | A1 | 12/2004 | Kisacanin et al. | |

(Continued)

OTHER PUBLICATIONS

Kuwahara et al., Development of Driver Distraction Control Function (Year: 2015).*

(Continued)

*Primary Examiner* — Quang Pham
(74) *Attorney, Agent, or Firm* — Morgan, Lewis & Bockius LLP

(57) ABSTRACT

An apparatus for controlling driving of a vehicle includes: an input device that receives an input signal corresponding to an operation of a driver; and a controller that sets a weight to a careless state of the driver based on a separation distance between the driver and the input device operated by the driver, a spaced angle, and a scheme of operating the input device, and calculates a braking application time point based on the weight.

16 Claims, 9 Drawing Sheets

(56) References Cited

U.S. PATENT DOCUMENTS

| | | | | |
|---|---|---|---|---|
| 2005/0004760 | A1* | 1/2005 | Urai | G01S 13/931 340/436 |
| 2005/0030184 | A1* | 2/2005 | Victor | B60K 35/00 340/576 |
| 2005/0073136 | A1* | 4/2005 | Larsson | A61B 5/11 180/272 |
| 2007/0247524 | A1* | 10/2007 | Yoshinaga | G06V 40/193 348/78 |
| 2007/0291113 | A1* | 12/2007 | Haug | G08G 1/166 348/E7.087 |
| 2008/0042813 | A1* | 2/2008 | Wheatley | B60Q 9/008 340/439 |
| 2008/0084499 | A1* | 4/2008 | Kisacanin | A61B 5/163 348/370 |
| 2009/0066474 | A1* | 3/2009 | Kawachi | G05G 1/06 340/3.1 |
| 2010/0033333 | A1* | 2/2010 | Victor | G06V 20/597 340/576 |
| 2014/0129082 | A1* | 5/2014 | Takahashi | B60K 37/06 701/36 |
| 2014/0129987 | A1* | 5/2014 | Feit | G06F 3/04817 715/835 |
| 2015/0149079 | A1* | 5/2015 | Breed | B60N 2/888 701/428 |
| 2015/0210292 | A1* | 7/2015 | George-Svahn | B60W 50/10 348/148 |
| 2015/0239477 | A1* | 8/2015 | Kitagawa | G01C 21/3407 701/1 |
| 2015/0314681 | A1* | 11/2015 | Riley, Sr | B60K 28/066 340/576 |
| 2016/0044575 | A1* | 2/2016 | Rajeevalochana | H04W 8/245 455/410 |
| 2016/0075332 | A1 | 3/2016 | Edo-Ros | |
| 2016/0117947 | A1* | 4/2016 | Misu | B60W 50/085 434/62 |
| 2016/0148064 | A1* | 5/2016 | Heo | G06V 20/597 348/148 |
| 2016/0173865 | A1* | 6/2016 | Park | G06F 3/013 348/118 |
| 2016/0180677 | A1* | 6/2016 | Reed | H04W 4/48 340/576 |
| 2016/0185220 | A1* | 6/2016 | Mere | B60K 37/06 340/438 |
| 2016/0224852 | A1* | 8/2016 | Vicente | B60Q 9/00 |
| 2016/0267335 | A1* | 9/2016 | Hampiholi | B60K 28/06 |
| 2016/0355190 | A1* | 12/2016 | Omi | B60W 30/12 |
| 2017/0106876 | A1* | 4/2017 | Gordon | B60W 50/082 |
| 2017/0120749 | A1* | 5/2017 | Dias | G06F 3/013 |
| 2017/0169709 | A1* | 6/2017 | Ando | G08G 1/161 |
| 2017/0282915 | A1* | 10/2017 | Kim | B60W 30/09 |
| 2017/0364148 | A1* | 12/2017 | Kim | G06F 3/1454 |
| 2018/0059773 | A1* | 3/2018 | Park | G06F 3/04847 |
| 2018/0086346 | A1* | 3/2018 | Fujisawa | B60W 40/08 |
| 2018/0111552 | A1* | 4/2018 | Neiswander | B60Q 9/008 |
| 2018/0178784 | A1* | 6/2018 | Ohta | B60T 8/17 |
| 2018/0231976 | A1* | 8/2018 | Singh | B60W 40/08 |
| 2018/0244279 | A1* | 8/2018 | Kochhar | G08B 21/06 |
| 2018/0285665 | A1* | 10/2018 | Paszkowicz | B60W 50/0098 |
| 2019/0012920 | A1* | 1/2019 | Tamura | B60W 30/09 |
| 2019/0031102 | A1* | 1/2019 | Kishimoto | G08G 1/167 |
| 2019/0079717 | A1* | 3/2019 | Lee | B60K 37/06 |
| 2019/0122525 | A1* | 4/2019 | Lancelle | B60Q 9/00 |
| 2019/0213429 | A1* | 7/2019 | Sicconi | G06F 3/167 |
| 2019/0256084 | A1* | 8/2019 | Lee | B60T 7/22 |
| 2019/0329762 | A1* | 10/2019 | Kwon | B60T 8/17558 |
| 2019/0367016 | A1* | 12/2019 | Brännström | B60W 50/16 |
| 2019/0367050 | A1* | 12/2019 | Victor | B60W 30/09 |
| 2020/0101970 | A1* | 4/2020 | Reinert | B60T 7/12 |
| 2020/0108771 | A1* | 4/2020 | Kang | G06T 7/62 |
| 2020/0108805 | A1* | 4/2020 | Woo | G01S 13/867 |
| 2020/0324780 | A1* | 10/2020 | Stec | G06V 40/167 |
| 2021/0070359 | A1* | 3/2021 | Lee | B60R 11/04 |
| 2021/0167518 | A1* | 6/2021 | Achour | H01Q 13/28 |
| 2021/0276561 | A1* | 9/2021 | Hayakawa | B60W 30/18163 |
| 2021/0309242 | A1* | 10/2021 | Hayakawa | B60W 60/0016 |

OTHER PUBLICATIONS

Taamneh et al., A multimodal dataset for various forms of distracted driving (Year: 2017).*

Edgar Snyder, Texting and Driving Accident Statistics—Distracted Driving (Year: 2020).*

Martinelli et al., Neural Networks for Driver Behavior Analysis (Year: 2021).*

Akiduki et al., Inattentive Driving Detection Using Body-Worn Sensors Feasibility Study (Year: 2022).*

Calinescu et al., Maintaining driver attentiveness in shared-control autonomous driving (Year: 2021).*

Fernandez et al., Driver Distraction Using Visual-Based Sensors and Algorithms (Year: 2021).*

Groom et al., Driving behaviour in adults with attention deficithyperactivity disorder (Year: 2015).*

* cited by examiner

APPARATUS AND METHOD FOR CONTROLLING DRIVING OF VEHICLE

CROSS-REFERENCE TO RELATED APPLICATION

This application claims the benefit of priority to Korean Patent Application No. 10-2020-0078289, filed in the Korean Intellectual Property Office on Jun. 26, 2020, the entire contents of which are incorporated herein by reference.

TECHNICAL FIELD

The present disclosure relates to an apparatus and a method for controlling driving of a vehicle.

BACKGROUND

Recently, a vehicle driving assist technology has been developed to warn of a careless state of a driver or to determine a risk of collision with a front pedestrian and an obstacle during parking to perform warning or braking control.

However, a separate camera for recognizing the driver's face or condition must be provided to determine the carelessness of a driver, so that the cost increases. In addition, when an obstacle or line cannot be correctly recognized due to an external environment, a warning or braking function is not performed.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides an apparatus and a method for controlling driving of a vehicle capable of determining a careless state of a user without adding a separate camera or sensor, and performing a braking function based on the determination result.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving of a vehicle includes: an input device that receives an input signal corresponding to an operation of a driver; and a controller that sets a weight to a careless state of the driver based on a separation distance between the driver and the input device operated by the driver, a spaced angle, and a scheme of operating the input device, and calculates a braking application time point based on the weight.

The input device may be provided in at least one of a steering wheel, a gear box, a vehicle door pocket, a center fascia, and a portable terminal.

The controller may determine whether manipulation by the driver is in the input device, determine whether the steering wheel is operated based on torque applied to the steering wheel when the controller determines that the manipulation by the driver is not in the input device, and set the weight based on a determination result.

The controller may determine whether the input device having the manipulation by the driver is the portable terminal, and set the weight to a maximum value when the controller determines that the input device is the portable terminal.

The controller may adjust the weight corresponding to the separation distance when the controller determines that the input device having the manipulation by the driver is not the portable terminal.

The controller may adjust the weight corresponding to the spaced angle.

The controller may increase the weight when the controller determines that a number of operations within a first time exceeds a threshold value or an operation is maintained for a second time or more based on the scheme of operating the input device.

The controller may calculate an estimated collision time based on a distance to an obstacle in front of the vehicle, and control to brake when the estimated collision time is ahead of the braking application time point.

According to another aspect of the present disclosure, a method of controlling driving of a vehicle includes: receiving, by an input device, an input signal corresponding to an operation of a driver, setting a weight to a careless state of the driver based on a separation distance between the driver and the input device operated by the driver, a spaced angle, and a scheme of operating the input device, and calculating a braking application time point based on the weight.

The input device may be provided in at least one of a steering wheel, a gear box, a vehicle door pocket, a center fascia, and a portable terminal.

The setting of the weight may include determining whether manipulation by the driver is in the input device, determining whether the steering wheel is operated based on torque applied to the steering wheel when it is determined that the manipulation by the driver is not in the input device, and setting the weight based on a determination result.

The setting of the weight may include determining whether the input device having the manipulation by the driver is the portable terminal, and setting the weight to a maximum value when it is determined that the input device is the portable terminal.

The setting of the weight may include adjusting the weight corresponding to the separation distance when it is determined that the input device having the manipulation by the driver is not the portable terminal.

The setting of the weight includes adjusting the weight corresponding to the spaced angle.

The setting of the weight may include increasing the weight when it is determined that a number of operations within a first time exceeds a threshold value or maintaining the operation for a second time or more based on the scheme of operating the input device.

The method may further include calculating an estimated collision time based on a distance to an obstacle in front of the vehicle, and controlling to brake when the estimated collision time is ahead of the braking application time point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
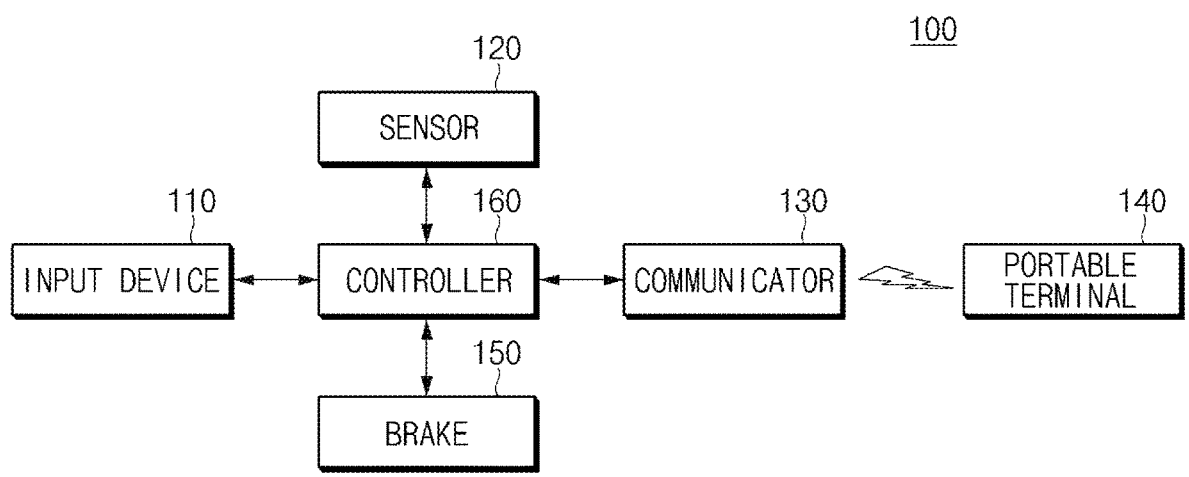
FIG. 1 is a block diagram illustrating the configuration of an apparatus for controlling driving of a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating the configuration of an apparatus for controlling driving of a vehicle according to an embodiment of the present disclosure.

As shown in FIG. 1, an apparatus 100 for controlling driving of a vehicle may include an input device 110, a sensor 120, a communicator 130, a portable terminal 140, a brake 150, and a controller 160.

The input device 110 may receive an input signal corresponding to the operation of a driver, and the controller 160 may determine the position of the input device operated in correspondence with the input signal. According to an embodiment, the input device 110 may be provided in at least one of a steering wheel, a gear box, a vehicle door, a center fascia, or a portable terminal, and may be implement with a scroll wheel, a button, a knob, a touch screen, a touch pad, a lever, a track ball, and the like, which may be operated to be in at least one stage. For example, the input device 110 may include an operation device provided in the steering wheel to control the volume of audio, and an operation device provided in the gear box to control performance of an Audio, Video, Navigation (AVN) device or a main function of a vehicle. In addition, the input device 110 may include an operation device that is provided in a pocket portion of a vehicle door to open and close a window, and an operation device that is provided in the center fascia to control an AVN device or an audio device. In this case, the AVN device may refer to a device capable of integrally performing an audio function, a video function, and a navigation function in response to manipulation.

The sensor 120 may detect a torque value of a steering column generated when the steering wheel is rotated. The sensor 120 may be implemented with a torque sensor. In addition, the sensor 120 may detect an obstacle in front of the vehicle, and to this end, the sensor 120 may include an ultrasonic sensor, a radar, or a lidar. The controller 160 may calculate the distance to the obstacle based on the information sensed by the sensor.

The communicator 130 may communicate with the portable terminal 140 of a driver. According to an embodiment, the communicator 130 may communicate with the portable terminal 140 in various communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. However, the present disclosure is not limited thereto, and the communicator 130 may communicate with the portable terminal 140 through a cable.

The portable terminal 140 may include a mobile terminal, and, for example, may include a smart phone of a driver, a smart pad, and the like.

The brake 150 may generate a braking force under the control of the controller 160 to cause the vehicle to decelerate.

The controller 160 may be implemented with various processing devices such as a microprocessor equipped with a semiconductor chip or the like capable of performing operations or executions of various commands, and may control an apparatus for controlling driving of a vehicle according to an embodiment of the present disclosure. In detail, the controller 160 may classify the separation distance to the input device 110 operated by the driver, the spaced angle and the scheme of operating the input device, set a weight to a careless state of the driver based on the classification result, and calculate a braking application time point based on the weight.

In more detail, the controller 160 may determine the distance and the spaced angle of the input device 110, which is operated by the driver, spaced apart from the driver. More details will be described with reference to FIGS. 2 and 3.

Figure 2:
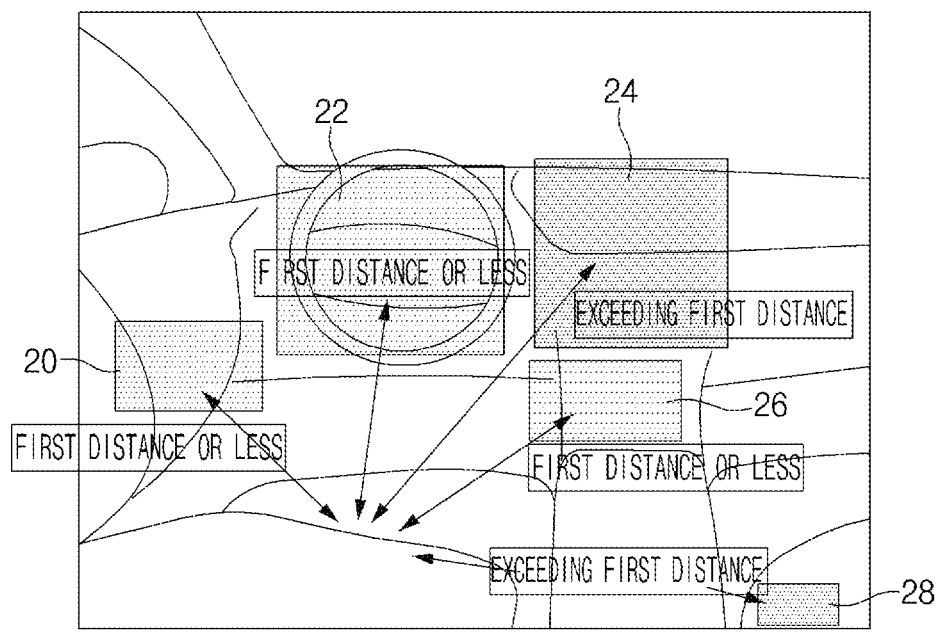
FIG. 2 is a view illustrating the distance between an input device and a driver according to an embodiment of the present disclosure.
Figure 3:
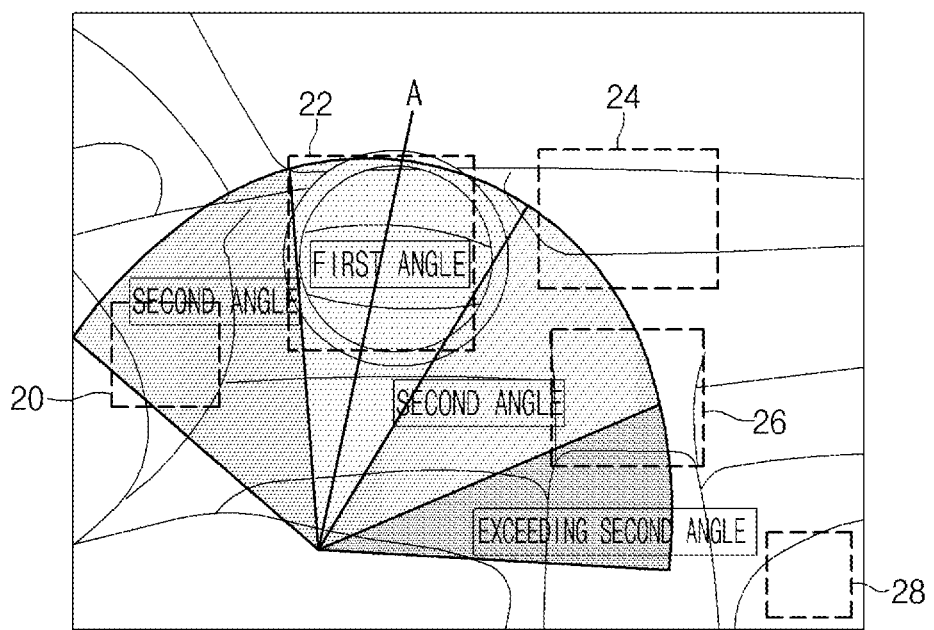
FIG. 3 is a view illustrating an angle corresponding to the position of an input device based on a driver's view according to an embodiment of the present disclosure.

FIG. 2 is a view illustrating the distance between an input device and a driver according to an embodiment of the present disclosure. FIG. 3 is a view illustrating an angle corresponding to the position of an input device based on a driver's view according to an embodiment of the present disclosure.

As shown in FIG. 2, the controller 160 may classify the distance between the driver and the input device 110 manipulated by the driver. According to an embodiment, the controller 160 may classify the separation distance to the input device 110 provided in a vehicle door pocket 20, a steering wheel 22 and a gear box 26 as a first distance (e.g., 30 cm) or less. The controller 160 may classify the input device 110 provided in a center fascia 24 and a passenger seat side 28 as exceeding the first distance.

In addition, as shown in FIG. 3, the controller 160 may classify the angle from the gaze 'A' of the driver looking at the front to the input device 110. According to an embodiment, the controller 160 may classify the input device 110 provided in the steering wheel 22 as being spaced apart by ±a first angle or less, and the controller 160 may classify the input device 110 provided in the vehicle door pocket 20, the center fascia 24 and the gear box 26 as being spaced apart by ±a second degree or less. In addition, the controller 160 may classify the input device 110 provided in the passenger seat side 28 as exceeding the second angle.

The controller 160 may set the weight to the driver's careless state based on whether the steering wheel is operated, the classified separation distance from the driver to the input device, the classified spaced angle, and the scheme of operating the input device operation, and calculate the braking application time point based on the weight. According to an embodiment, the controller 160 may set the weights as shown in following Table 1. However, the weights listed in Table 1 are proposed in accordance with an embodiment of the present disclosure, and are not fixed to the numerical values shown in Table 1. That is, when it is determined that the steering wheel is not operated, the controller 160 may increase the weight, increase the weight as the distance between the input device and the driver increases, and decrease the weight as the distance between the input device and the driver decreases. In addition, the controller 160 may increase the weight as the angle of the input device spaced apart from the gaze direction in which the driver looks at the front increases, and decrease the weight as the angle of the input device decreases. In addition, based on the operation scheme, the controller 160 may increase the weight when it is determined that the number of operations within the first time exceeds a threshold value or the operation is maintained for the second time or more (multi-stage operation), and may decrease the weight when it is determined that the number of operations within the first time is less than or equal to the threshold value, or the operation is maintained for less than the second time (one stage operation).

TABLE 1

|  | Operation/first distance or less First angle or less/one stage operation | Non-operation/ exceeding first distance Second angle or less/multistage operation | Exceeding of second angle |
| --- | --- | --- | --- |
| Steering wheel operation | 0 | +4 | — |
| Separation distance | +2 | +3 | — |
| Separation angle | +1 | +2 | +3 |
| Operation scheme | +1 | +3 | — |

According to an embodiment, the controller 160 may calculate a difference value between the torque applied to the steering wheel and the torque applied by the motor-driven power steering (MDPS) for control of the vehicle, and determine that the steering wheel is not operated when the difference value is less than a non-operation torque reference value. Meanwhile, when the difference value is greater than or equal to the non-operation torque reference value, the controller 160 may determine that the steering wheel is operated. As shown in Table 1, the controller 160 may set the weight to '0' when it is determined that the steering wheel is operated, and set the weight to '1' when it is determined that the steering wheel is not operated.

When it is determined that the separation distance from the driver to the input device operated by the driver is less than or equal to the first distance, the controller 160 may set the weight to '2', and when it is determined that the separation distance from the driver to the input device operated by the driver exceeds the first distance, the controller 160 may set the weight to '3'.

In addition, when it is determined that the angle spaced from the gaze direction in which the driver looks at the front to the input device 110 operated by the driver is less than or equal to the first angle (e.g., 10°), the controller 160 may set the weight to '1'. When it is determined that the spaced angle is less than or equal to the second angle (e.g., 45°) greater than the first angle, the controller 160 may set the weight to '2'. When it is determined that the spaced angle exceeds the second angle, the controller 160 may set the weight to '3'.

In addition, the controller 160 may set the weight to '1' when it is determined that the number of operations within the first time is less than or equal to a threshold value or an operation is maintained for less than the second time (one stage operation), based on the operation scheme. The controller 160 may set the weight to '3' when it is determined that the number of operations within the first time exceeds the threshold value or an operation is maintained for the second time or more (multi-stage operation). When it is determined that the operation scheme is the one stage operation, the controller 160 may set the weight to '1'.

In addition, when it is determined that the portable terminal 140 is in communication and the portable terminal 140 is operated by the driver, the controller 160 may set the weight to the maximum value. According to an embodiment, the controller 160 may set weights corresponding to states in which the separation distance exceeds the first distance, the spaced angle is less than or equal to the second angle, and the number of operations within the first time exceeds the threshold value.

The controller 160 may calculate the braking application time point by using following Formula 1 based on the weights set corresponding to the separation distance to the input device operated by the driver, the spaced angle, and the operation scheme.

Braking application time point=(1+$C$*Sum of weights)*Initial value of braking application time point  <Formula 1>

($C$=constant in driver's careless state, which varies with position of input device, Initial value of braking application time point=1)

More details will be described with reference to FIGS. 4 to 7.

Figure 4:
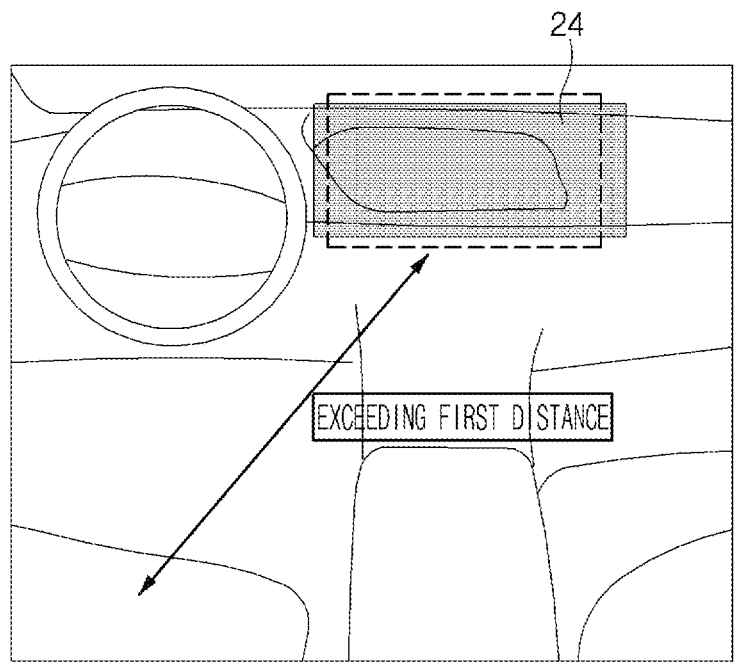
FIGS. 4 and 5 are views illustrating the distance and angle of an input device according to an embodiment of the present disclosure.
Figure 5:
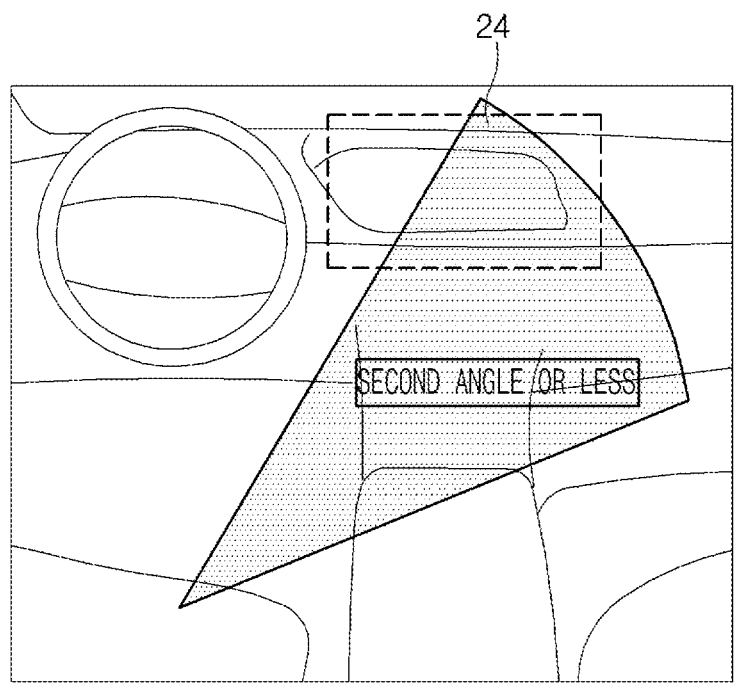

FIGS. 4 and 5 are views illustrating the distance and angle of an input device according to an embodiment of the present disclosure.

As shown in FIGS. 4 and 5, when the controller 160 determines that the input device operated by the driver is provided in the center fascia 24 (see FIG. 2), the controller may determine that the separation distance exceeds the first distance and the spaced angle is less than or equal to the second angle.

In addition, when it is determined that the number of operations within the first time exceeds the threshold value or the operation is maintained for more than the second time (multi-stage operation), according to the operation scheme of the input device, the controller 160 may calculate the sum of weights set corresponding to the separation distance from the driver to the input device operated by the driver, the spaced angle and the operation scheme (refer to Table 1, 3+2+3=8). In addition, when it is determined that the input device provided in the center fascia is operated, the controller 160 may set 'C' to '0.05' and set the default value of the braking application time point to 1 second to calculate the braking application time point of 1.4 seconds based on Formula 1 ((1+0.05*8)*1=1.4).

Figure 6:
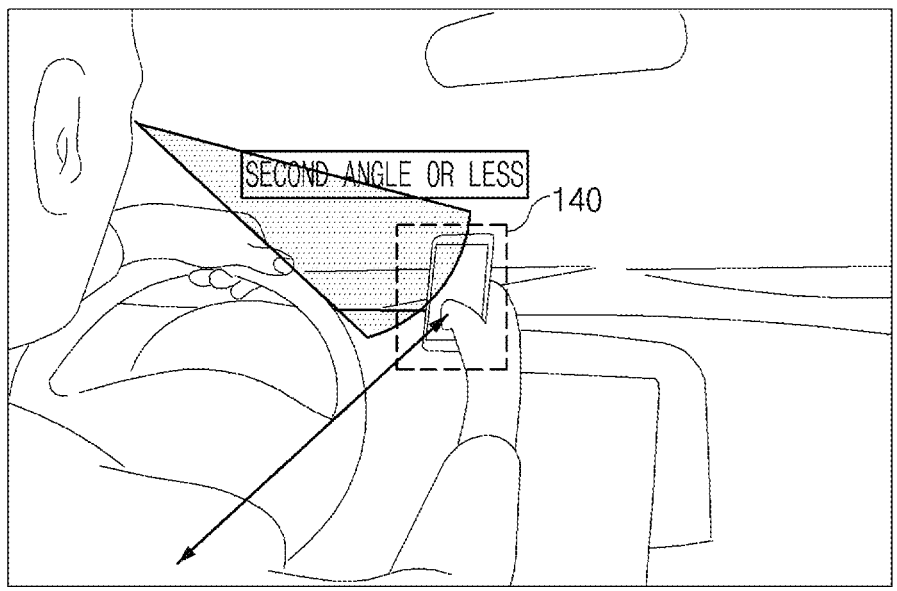
FIG. 6 is a view showing the distance and angle of the input device according to another embodiment of the present disclosure.

FIG. 6 is a view showing the distance and angle of the input device according to another embodiment of the present disclosure.

As shown in FIG. 6, when the controller 160 determines that the input device operated by the driver is a portable terminal, the controller 160 may determine that the separation distance exceeds the first distance and the spaced angle is less than or equal to the second angle. In addition, when it is determined that the number of operations within the first time exceeds the threshold value or the operation is maintained for more than the second time (multi-stage operation), according to the operation scheme of the input device, the controller 160 may calculate the sum of weights set corresponding to the separation distance from the driver to the input device operated by the driver, the spaced angle and the operation scheme (refer to Table 1, 3+2+3=8). In addition, when it is determined that the portable terminal is operated, the controller 160 may set 'C' to 0.05 and set the default value of the braking time point to 1 second, thereby calculating the braking application time point of 1.4 seconds based on Formula 1 ((1+0.05*8)*1=1.4).

Figure 7:
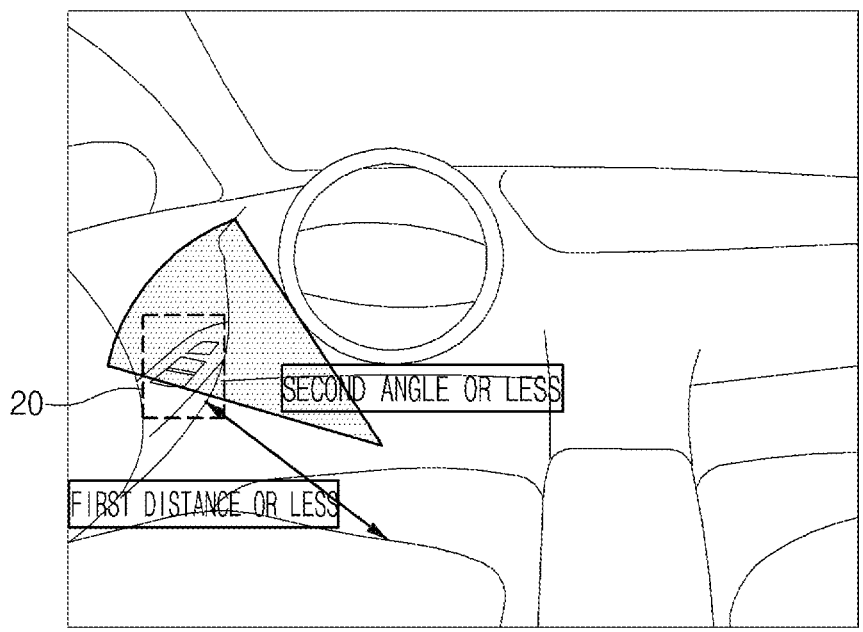
FIG. 7 is a view illustrating the distance and angle of an input device according to another embodiment of the present disclosure.

FIG. 7 is a view illustrating the distance and angle of an input device according to another embodiment of the present disclosure.

As shown in FIG. 7, when it is determined that the input device operated by the driver is provided in the pocket portion of the vehicle door, the controller 160 may determine that the separation distance is less than or equal to the first distance and the spaced angle is less than or equal to the second angle. In addition, when it is determined that the number of operations within the first time is less than or equal to the threshold value or the operation is maintained for less than the second time (one stage operation), according to the operation scheme of the input device, the controller 160 may calculate the sum of weights set corresponding to the separation distance from the driver to the input device operated by the driver, the spaced angle and the operation scheme (refer to Table 1, 1+2+1=4). In addition, when it is determined that the input device provided in the door pocket portion of the vehicle is operated, the controller 160 may set 'C' to 0.02 and set the default value of the braking application time point to 1 second, thereby calculating the braking application time point of 1.08 seconds based on Formula 1 ((1+0.02*4)*1=1.08).

In addition, although not illustrated, when it is determined that the driver does not operate the input device according to still another embodiment, it may be determined whether the steering wheel is operated and a weight may be set corresponding to the driver's careless state. When it is determined that the steering wheel is operated, with reference to Table 1, the controller 160 may set the weight to '4', sets C to 0.05, and set the default value of the braking application time point to 1 second, thereby calculating the braking application time point of 1.2 seconds based on Formula 1 ((1+0.05*4)*1=1.2).

The controller 160 may calculate the distance to the obstacle in front of the vehicle based on the information detected by the sensor 120, and may calculate the estimated collision time (TTC) based on the distance to the obstacle. In addition, the controller 160 may control to brake when the estimated collision time based on the distance to the obstacle is ahead of the braking application time point.

Figure 8:
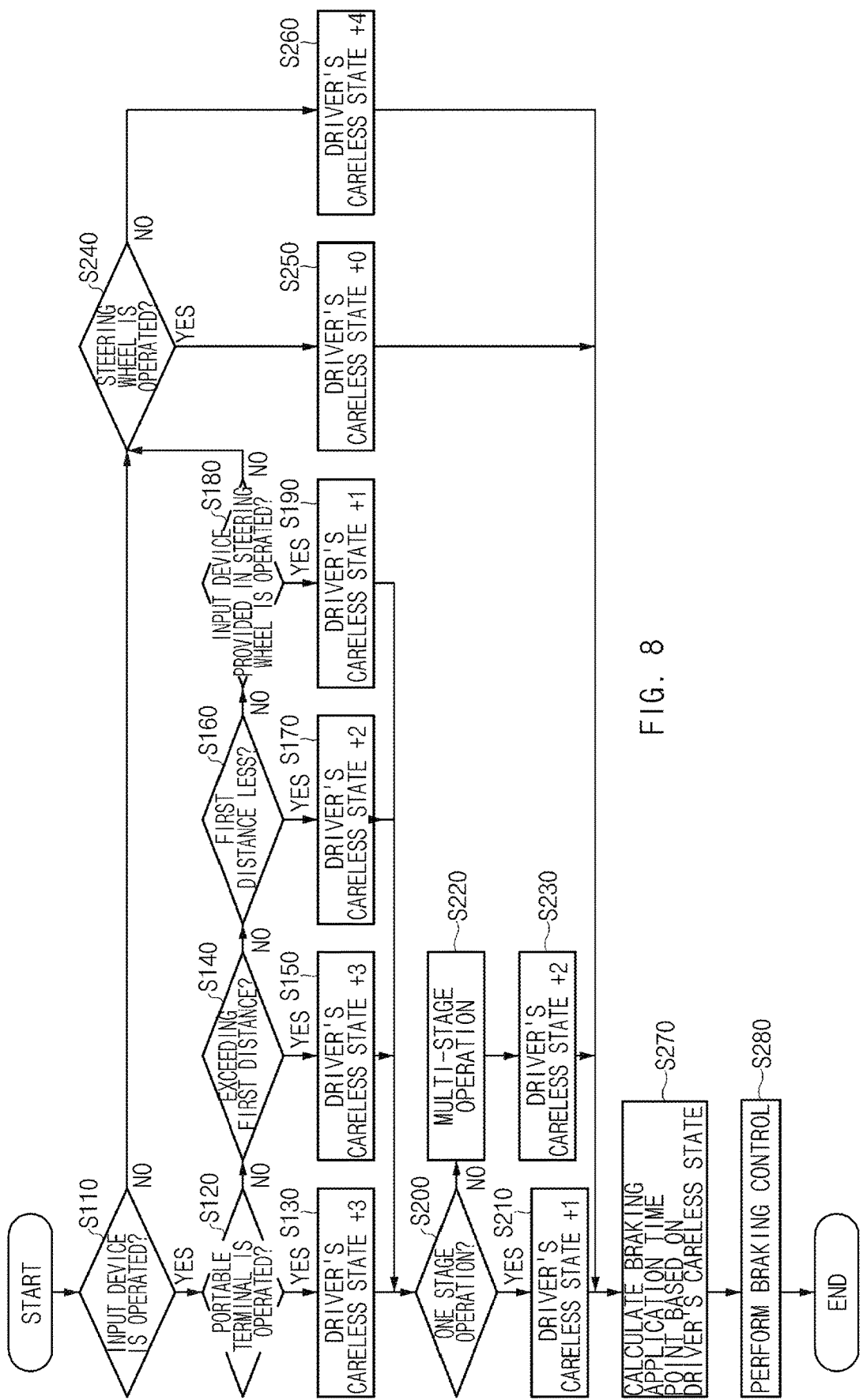
FIG. 8 is a flowchart illustrating a method of controlling driving of a vehicle according to an embodiment of the present disclosure.

FIG. 8 is a flowchart illustrating a method of controlling driving of a vehicle according to an embodiment of the present disclosure.

As shown in FIG. 8, in operation S110, the controller 160 determines whether the input device 110 is operated by the driver. When the controller 160 determines that the input device 110 is operated by the driver in operation S110 (Y), the controller 160 determines whether the input device 110 operated by the driver is a portable terminal in operation S120. When it is determined in operation S120 that the input device 110 operated by the driver is an electronic device (Y), the controller 160 may set the weight to '3' based on the driver's careless state in operation S130.

Meanwhile, when the controller 160 determines that the input device 110 operated by the driver is not a portable terminal device (N), the controller 160 determines whether the separation distance between the input device 110 operated by the driver and the driver exceeds the first distance in operation S140. When it is determined in operation S140 that the separation distance from the driver exceeds the first distance (Y), the controller 160 may set the weight to '3' based on the driver's careless state in operation S150.

When it is determined in operation S140 that the distance separated from the driver does not exceed the first distance (N), the controller 160 determines whether the input device 110 is separated from the driver by the first distance or less in operation S160. When it is determined in operation S160 that the distance separated from the driver is less than or equal to the first distance (Y), in operation S170, the controller 160 may set the weight to '2' based on the driver's careless state.

When it is determined in operation S160 that the distance between the input device 110 and the driver does not exceed the first distance (N), the controller 160 may determine whether the input device 110 operated by the driver is provided on the steering wheel in operation S180. When it is determined in operation S180 that the input device 110 operated by the driver is provided on the steering wheel, the controller 160 may determine whether the angle between the input device 110 operated by the driver and the driver is less than or equal to the first angle. Accordingly, when it is determined in operation S180 that the input device 110 operated by the driver is provided on the steering wheel, in operation S190, the controller 160 may set the weight to '1' based on the driver's careless state. When it is determined in operation S180 that the input device 110 provided in the steering wheel has not been operated, in operation S240, the controller 160 may determine whether the steering wheel is operated.

After the controller 160 determines the distance and angle between the input device 110 operated by the driver and the driver through operations S120 to S180, the controller 160 may determine the operation scheme. In operation S210, the controller 160 may determine whether the number of operations within the first time is equal to or less than the threshold value or the operation is maintained for less than the second time (one operation). When it is determined in operation S210 that the input device 110 is operated by the driver (Y), the controller 160 may set the weight to '1' based on the driver's carelessness state in operation 210. Meanwhile, when it is determined in operation S210 that the input device 110 is not operated by the driver (N), the controller 160 may determine that the number of operations within the first time exceeds the threshold value, or the operation is maintained for the second time or more (multi-stage operation) in operation S220. In addition, the controller 160 may set the weight to '2' based on the driver's careless state in operation S230.

When it is determined in operation S110 that the input device 110 is not operated by the driver (N), the controller 160 may determine whether the steering wheel is operated in operation S240. In S200, the controller 160 may calculate the difference value between the torque applied to the steering wheel and the torque applied by the motor-driven power steering (MDPS) to control the vehicle, and may determine that the steering wheel is operated when the difference value is greater than or equal to the non-operation torque reference value. When it is determined in operation S240 that the steering wheel is operated (Y), the controller 160 may set the weight to '0' based on the driver's careless state in operation S250, and when it is determined in operation S200 that the steering wheel is not operated (N), the controller 160 may set the weight to '4' based on the driver's careless state in operation S260.

In operation S270, the controller 160 may calculate the braking application time point based on the weight based on the driver's careless state set through operations S120 to S260. The details of operation S270 have been described with reference to FIGS. 4 to 7.

In operation S280, the controller 160 may control to brake when the estimated collision time is ahead of the braking application time point based on the distance to the obstacle. In S280, the controller 160 may calculate the distance to the obstacle in front of the vehicle based on the information detected by the sensor 120, calculate the estimated collision time (TTC) based on the distance to the obstacle, and control to brake based on the estimated collision time calculated.

Figure 9:
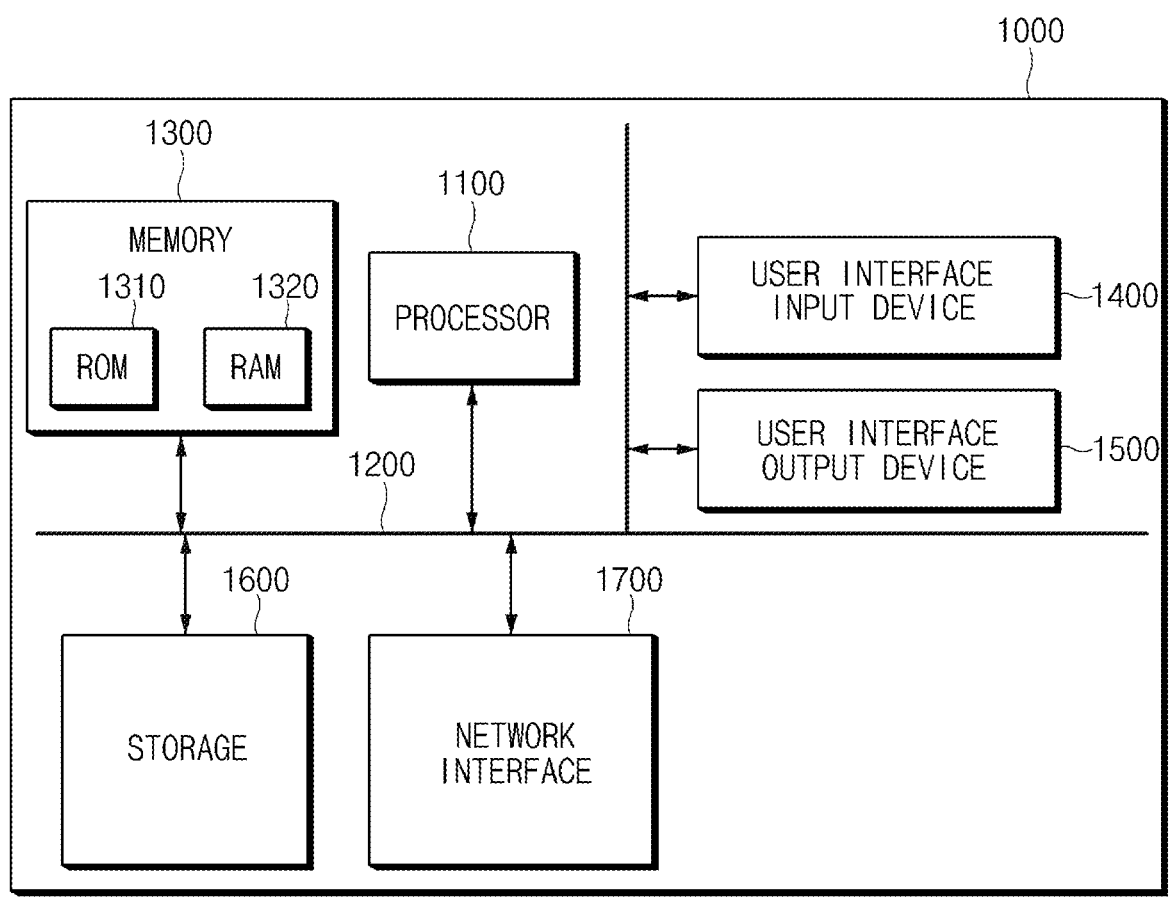
FIG. 9 is a block diagram illustrating a configuration of a computing system executing a method according to an embodiment of the present disclosure.

FIG. 9 is a block diagram illustrating a configuration of a computing system executing a method according to an embodiment of the present disclosure.

Referring to FIG. 9, a computing system 1000 may include at least one processor 1100, a memory 1300, a user interface input device 1400, a user interface output device 1500, storage 1600, or a network interface 1700, which are connected through a system bus 1200.

The processor 1100 may be a central processing device (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the apparatus for controlling driving of a vehicle and the method thereof, it is possible to determine a careless state of a driver without adding a separate camera or sensor, so that a warning and braking corresponding to the driver's careless state are performed without additional cost.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for controlling driving of a vehicle, the apparatus comprising:
   an input device configured to receive an input signal corresponding to a handling of a driver; and
   a controller configured to:
   determine a position of the input device when the input device is handled by the driver;
   set a weight to a careless state of the driver based on a separation distance between the driver and the input device handled by the driver, a spaced angle from a gaze direction of the driver looking at the input device handled by the driver, and a scheme of handling the input device,
   calculate a braking application time point based on said weight corresponding to the careless state of the driver, and
   increase said weight corresponding to the careless state of the driver, as the separation distance between the input device handled by the driver and the driver increases.

2. The apparatus of claim 1, wherein the input device includes at least one of a steering wheel, a gear box, a vehicle door pocket, a center fascia, or a portable terminal.

3. The apparatus of claim 2, wherein the controller is configured to: determine whether manipulation by the driver is in the input device, determine whether the steering wheel is handled based on a torque applied to the steering wheel upon determining that the manipulation by the driver is not in the input device, and set the weight based on a determination result of whether the steering wheel is handled.

4. The apparatus of claim 3, wherein the controller is configured to:
   determine whether the input device having the manipulation by the driver is the portable terminal, and
   set the weight to a maximum value upon determining that the input device is the portable terminal.

5. The apparatus of claim 4, wherein the controller is configured to adjust the weight corresponding to the separation distance upon determining that the input device having the manipulation by the driver is not the portable terminal.

6. The apparatus of claim 1, wherein the controller is configured to adjust the weight corresponding to the spaced angle.

7. The apparatus of claim 1, wherein the controller is configured to increase the weight upon determining that a number operation of the handling within a first time exceeds a threshold value or the handling is maintained for a second time or more based on the scheme of handling the input device.

8. The apparatus of claim 1, wherein the controller is configured to:
calculate an estimated collision time based on a distance to an obstacle in front of the vehicle, and
control to brake when the estimated collision time is ahead of the braking application time point.

9. A method, executed by an apparatus, for controlling driving of a vehicle, the method comprising:
receiving, by an input device, an input signal corresponding to a handling of a driver;
determining, by a controller of the apparatus, a position of the input device which is handled by the driver based on the input signal;
setting, by the controller, a weight to a careless state of the driver based on a separation distance between the driver and the input device handled by the driver, a spaced angle from a gaze direction of the driver looking at the input device handled by the driver, and a scheme of handling the input device; and
calculating, by the controller, a braking application time point based on said weight corresponding to the careless state of the driver, and
increasing, by the controller, said weight corresponding to the careless state of the driver as the separation distance between the input device handled by the driver and the driver increases.

10. The method of claim 9, wherein the input device is provided in at least one of a steering wheel, a gear box, a vehicle door pocket, a center fascia, or a portable terminal.

11. The method of claim 10, wherein the setting the weight includes:
determining, by the controller, whether manipulation by the driver is in the input device,
determining, by the controller, whether the steering wheel is handled based on a torque applied to the steering wheel when it is determined that the manipulation by the driver is not in the input device, and
setting, by the controller, the weight based on a determination result of whether the steering wheel is handled.

12. The method of claim 11, wherein the setting the weight includes determining, by the controller, whether the input device having the manipulation by the driver is the portable terminal, and setting, by the controller, the weight to a maximum value when it is determined that the input device is the portable terminal.

13. The method of claim 12, wherein the setting of the weight includes adjusting, by the controller, the weight corresponding to the separation distance upon determining that the input device having the manipulation by the driver is not the portable terminal.

14. The method of claim 9, wherein the setting the weight includes adjusting, by the controller, the weight corresponding to the spaced angle.

15. The method of claim 9, wherein the setting the weight includes increasing, by the controller, the weight upon determining that a number operation of the handling within a first time exceeds a threshold value or the handling is maintained for a second time or more based on the scheme of handling the input device.

16. The method of claim 9, further comprising:
calculating, by the controller, an estimated collision time based on a distance to an obstacle in front of the vehicle; and controlling, by the controller, to brake when the estimated collision time is ahead of the braking application time point.

* * * * *